United States Patent
Fanning et al.

(10) Patent No.: US 8,180,792 B2
(45) Date of Patent: May 15, 2012

(54) METHOD OF PROCESSING SONG CLAIMS INVOLVING SONGS INCLUDING, BUT NOT LIMITED TO MUSICAL WORKS, COMPOSITIONS, ETC

(75) Inventors: Shawn Fanning, San Francisco, CA (US); Jordan Mendelson, San Francisco, CA (US); Ali Aydar, San Francisco, CA (US)

(73) Assignee: Myspace Music LLC, Beverly Hills, CA (US)

( * ) Notice: Subject to any disclaimer, the term of this patent is extended or adjusted under 35 U.S.C. 154(b) by 670 days.

(21) Appl. No.: 11/434,409

(22) Filed: May 15, 2006

(65) Prior Publication Data
US 2006/0212403 A1    Sep. 21, 2006

Related U.S. Application Data

(63) Continuation of application No. 10/547,171, filed as application No. PCT/US2004/005517 on Feb. 24, 2004.

(60) Provisional application No. 60/450,015, filed on Feb. 25, 2003.

(51) Int. Cl.
  *G06F 7/00*    (2006.01)
(52) U.S. Cl. ........ 707/781; 707/782; 707/783; 707/784; 715/741; 705/51
(58) Field of Classification Search ............... 707/3, 781
See application file for complete search history.

(56) References Cited

U.S. PATENT DOCUMENTS

| | | | |
|---|---|---|---|
| 5,502,766 | A | 3/1996 | Boebert et al. |
| 5,629,980 | A | 5/1997 | Stefik et al. |
| 5,765,152 | A | 6/1998 | Erickson |
| 5,790,935 | A | 8/1998 | Payton |
| 5,862,260 | A | 1/1999 | Rhoads |
| 5,892,900 | A | 4/1999 | Ginter et al. |
| 5,903,892 | A | 5/1999 | Hoffert et al. |
| 5,956,482 | A | 9/1999 | Agraharam et al. |
| 5,990,884 | A | 11/1999 | Douma et al. |
| 6,041,411 | A | 3/2000 | Wyatt |
| 6,144,726 | A | 11/2000 | Cross |
| 6,226,618 | B1 | 5/2001 | Downs et al. |
| 6,233,682 | B1 | 5/2001 | Fritsch .................... 713/168 |
| 6,236,971 | B1 | 5/2001 | Stefik et al. |
| 6,374,260 | B1 | 4/2002 | Hoffert et al. |
| 6,546,114 | B1 | 4/2003 | Venkatesan et al. |
| 6,574,348 | B1 | 6/2003 | Venkatesan et al. |

(Continued)

FOREIGN PATENT DOCUMENTS
EP    0808048    11/1997
(Continued)

OTHER PUBLICATIONS

PCT Written Opinion and Search Report from application No. PCT/US04/05517 mailed on Sep. 17, 2007.

(Continued)

*Primary Examiner* — Fazlul Quader
(74) *Attorney, Agent, or Firm* — Gates & Cooper LLP

(57) ABSTRACT

In one embodiment, a method is provided for receiving a song claim, and comparing the song claim to records of a database of songs. To this end, results of the comparing may be indicated. In various embodiments, such songs may include musical works, compositions, etc. Of course, songs in the form of a recording are also contemplated.

7 Claims, 7 Drawing Sheets

U.S. PATENT DOCUMENTS

| | | | |
|---|---|---|---|
| 6,598,164 | B1 | 7/2003 | Shepard |
| 6,658,568 | B1 | 12/2003 | Ginter et al. |
| 6,760,721 | B1 | 7/2004 | Chasen et al. |
| 6,763,148 | B1 | 7/2004 | Sternberg et al. |
| 6,772,225 | B1 | 8/2004 | Jennings, III et al. |
| 6,832,239 | B1 | 12/2004 | Kraft et al. |
| 6,871,200 | B2 | 3/2005 | MacQueen et al. |
| 6,895,392 | B2 | 5/2005 | Stefik et al. |
| 6,959,326 | B1 | 10/2005 | Day et al. |
| 6,968,366 | B1 | 11/2005 | Zhang et al. |
| 7,020,704 | B1 | 3/2006 | Lipscomb et al. |
| 7,092,953 | B1 | 8/2006 | Haynes |
| 7,110,984 | B1 | 9/2006 | Spagna et al. |
| 7,200,575 | B2 | 4/2007 | Hans et al. |
| 7,363,278 | B2 | 4/2008 | Schmelzer et al. |
| 2001/0037319 | A1 | 11/2001 | Edwards et al. |
| 2002/0002541 | A1 | 1/2002 | Williams |
| 2002/0010679 | A1 | 1/2002 | Felsher ............... 705/51 |
| 2002/0010759 | A1 | 1/2002 | Hitson et al. ............ 709/219 |
| 2002/0049910 | A1* | 4/2002 | Salomon et al. ........... 713/193 |
| 2002/0114522 | A1 | 8/2002 | Seeber |
| 2002/0143791 | A1 | 10/2002 | Levanon et al. |
| 2002/0143819 | A1 | 10/2002 | Han et al. |
| 2002/0169694 | A1 | 11/2002 | Stone et al. ............ 705/27 |
| 2003/0028896 | A1 | 2/2003 | Swart et al. |
| 2003/0031176 | A1 | 2/2003 | Sim |
| 2003/0074322 | A1 | 4/2003 | Wu ............... 705/57 |
| 2003/0080999 | A1 | 5/2003 | Stone et al. ............. 345/751 |
| 2003/0093790 | A1* | 5/2003 | Logan et al. .............. 725/38 |
| 2003/0105739 | A1 | 6/2003 | Essafi et al. |
| 2003/0110126 | A1 | 6/2003 | Dunkeld et al. ............. 705/39 |
| 2004/0052378 | A1 | 3/2004 | Shiragami et al. |
| 2004/0093278 | A1 | 5/2004 | Burchetta et al. |
| 2004/0133927 | A1 | 7/2004 | Sternberg et al. |
| 2004/0148191 | A1 | 7/2004 | Hoke ............... 705/1 |
| 2005/0004873 | A1* | 1/2005 | Pou et al. ............. 705/51 |
| 2005/0004875 | A1 | 1/2005 | Kontio et al. |
| 2005/0021398 | A1 | 1/2005 | McCleskey et al. |
| 2005/0042983 | A1 | 2/2005 | Borgward ............ 455/3.06 |
| 2005/0102260 | A1 | 5/2005 | Spring et al. ............ 707/1 |
| 2005/0119976 | A1* | 6/2005 | Taylor et al. ............. 705/52 |
| 2005/0125359 | A1 | 6/2005 | Levin et al. |
| 2005/0171932 | A1 | 8/2005 | Nandhra |
| 2006/0167803 | A1 | 7/2006 | Aydar et al. |
| 2007/0078769 | A1 | 4/2007 | Way |
| 2007/0203841 | A1 | 8/2007 | Maes |

FOREIGN PATENT DOCUMENTS

| | | |
|---|---|---|
| WO | WO02077847 | 10/2002 |
| WO | WO02103968 | 12/2002 |

OTHER PUBLICATIONS

International Search Report and Written Opinion from PCT Application No. PCT/US05/46552 which was mailed on Apr. 23, 2007.
PCT Written Opinion and Search Report from application No. PCT/US2005/47626 which was mailed on May 10, 2007.
Office Action Summary from U.S. Appl. No. 10/547,171 mailed on Mar. 5, 2009.
Definition of Commercialize, obtained from the internet at: http://www.thefreedictionary.com/commercialize, 1 pg.
Muller, "Desktop Encyclopedia of the Internet," 1999, Artech House Inc., Norwood, MA, 52 pages.
White, "How Computers Work," Millennium Edition, 1999, Que Corporation, Indianapolis, IN, 82 pages.
Derfler, "How Networks Work," Bestseller Edition, 1996, Ziff-Davis Press, Emeryville, CA, 69 pages.
Gralla, "How the Internet Works," Millennium Edition, 1999, Que Corporation, Indianapolis, IN, 35 pages.
International Search Report and Written Opinion for PCT/US05/46094 dated Feb. 8, 2007, 10 pages.
International Search Report and Written Opinion for PCT/US05/46396 dated Mar. 20, 2007, 7 pages.
International Search Report and Written Opinion for PCT/US05/46553 dated Jan. 29, 2007, 13 pages.
International Search Report and Written Opinion for PCT/US05/47618 dated Oct. 23, 2007, 10 pages.
Senior Contributor: JoAnne Woodcock, 1994, Microsoft Press Computer Dictionary, (Second Edition), p. 355.
Preliminary Report on Patentability for PCT/US05/46094 dated Jun. 26, 2007, 4 pages.
Preliminary Report on Patentability and Written Opinion for PCT/US05/047618 dated Dec. 11, 2007, 6 pages.

* cited by examiner

METHOD OF PROCESSING SONG CLAIMS INVOLVING SONGS INCLUDING, BUT NOT LIMITED TO MUSICAL WORKS, COMPOSITIONS, ETC

This is a continuation application of copending prior application Ser. No.: 10/547,171 filed Jun. 20, 2006, which, in turn, is a 35 USC §371 application of International Application No. PCT/US2004/005517 filed Feb. 24, 2004, designating the United States; which claims priority to U.S. Provisional Application No. 60/450,015 filed Feb. 25,2003, all of which are hereby incorporated by reference in their entirety.

FIELD OF THE INVENTION

The present application generally relates to the field of regulating access to content. The present application relates more specifically to regulating downloading and other machine reproduction of content based on rights of owners of content.

BACKGROUND

Bootlegging, surreptitious copying and other methods of acquiring content without compensating a rights-holder for content is an old problem. From the advent of movable type (and relatively easy printing) through the introduction of photocopying, technology has made copying and effectively stealing content easier and easier. The march of technology has recently caught audio and video content in its wake, particularly with the rise of the Internet.

However, this latest technology is based on digital representations of content, which can also incorporate various forms of copy protection and can allow for monitoring of transactions. Peer-to-peer and centralized content outlets presently exist. Exemplary of peer-to-peer content outlets are Gnutella™ and Kazaa™. Exemplary of centralized content outlets are iTunes™, audible.com™ and the defunct Napster™. Such content outlets provide access to a repository of content available typically as individual tracks of either audio (songs for example) or audiovisual/visual (movies for example) works. Presently, most content outlets may also be categorized as either authorized or unauthorized, with authorized content outlets providing content under a license from rights-holders and unauthorized content outlets providing unlicensed content. While some content may not require a license, most content of interest to consumers exists under restrictions of copyright held by authors and performers or their assignees. Many of the rights-holders are assignees of performers. Examples of rights-holders include media controllers such as studios, record labels and media companies, along with individual authors or performers. With current download technology and methodologies, many of the copies of content made in the downloading process are not licensed, and the rights-holders are not compensated for these copies. Thus, it may be useful to provide a way of compensating rights-holders for these copies. Some rights-holders have lost records of what content they hold rights to. Thus, it may be useful to provide a way for rights-holders to claim content, and to resolve disputes between multiple claimants to individual content. Similarly, some rights-holders have rights to vast amounts of content whereas other rights-holders may be concerned with small amounts of content. It may be useful to provide a single point of access for content outlets to determine what is owed for content, rather than a myriad number of rights-holders to contact.

SUMMARY

In one embodiment, a method is provided for receiving a song claim, and comparing the song claim to records of a database of songs. To this end, results of the comparing may be indicated. In various embodiments, such songs may include musical works, compositions, etc. Of course, songs in the form of a recording are also contemplated.

BRIEF DESCRIPTION OF THE DRAWINGS

Embodiments of the invention are illustrated in the figures. However, the embodiments and figures are illustrative rather than limiting, they provide examples of the invention.

DETAILED DESCRIPTION

Figure 1:
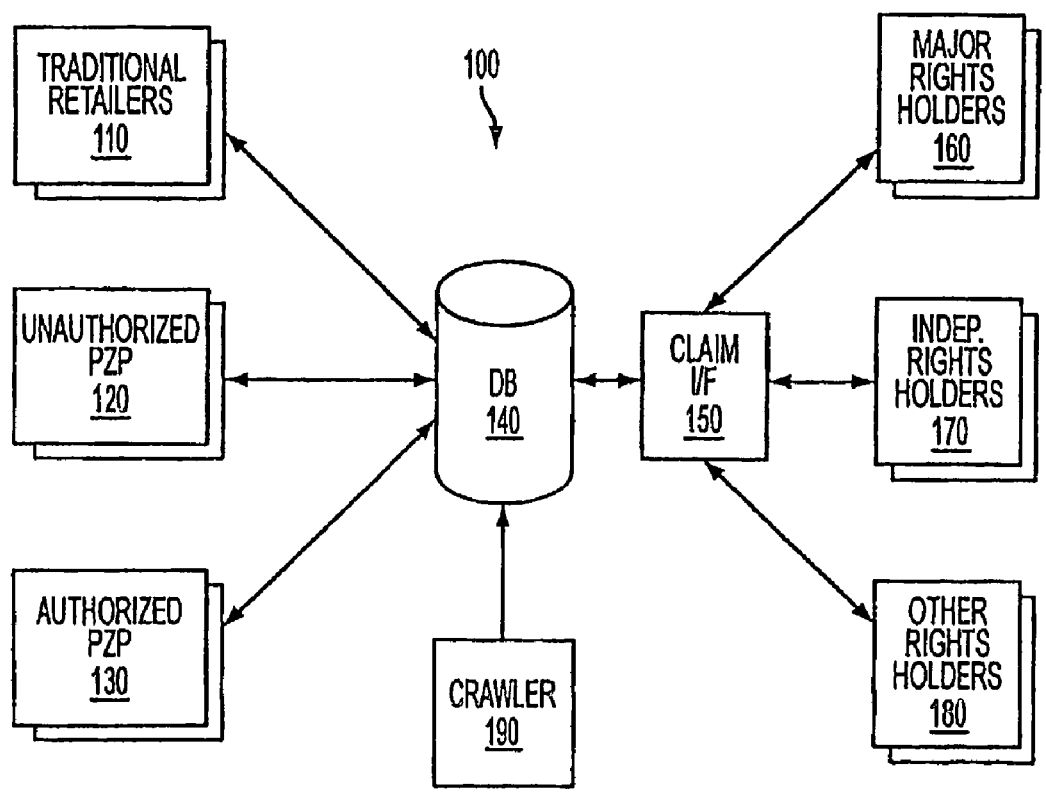
FIG. 1 illustrates an embodiment of a system for controlling access to content.

The present invention is described and illustrated in conjunction with systems, apparatuses and methods of varying scope. In addition to the aspects of the present invention described in this summary, further aspects of the invention will become apparent by reference to the drawings and by reading the detailed description that follows.

A method and apparatus for regulating content is provided. In one embodiment, the invention is a method. The method includes interfacing with a content outlet. The method further includes comparing attributes of content to be downloaded with attributes of content in a media database. The method also includes providing restrictions based on a result of the comparing. The method may further include monetizing the method. Additionally, the method may include distributing royalty payments to rights-holders of content.

In an alternate embodiment, the invention is a system. The system includes a database of content. The system also includes a rights-holder interface. The system further includes a content outlet interface. The system may further include a crawler. The system may also further include a financial interface.

In another alternate embodiment, the invention is a method. The method includes receiving a song selection. The method also includes comparing the song selection to records of a database of songs. The method further includes indicating results of the comparing. The method may also include monetizing the method. The method may further include providing restrictions to the song. The method may also include indicating the song is unclaimed. The method may further include prohibiting copying of the song.

In yet another alternate embodiment, the invention is an apparatus. The apparatus includes means for tracking content. The apparatus also includes means for interfacing between content users and the means for tracking content. The apparatus further includes means for interfacing between content rights-holders and the means for tracking content.

In yet another alternate embodiment, the invention is a method. The method includes receiving a song claim. The method also includes comparing the song claim to records of a database of songs. The method further includes indicating results of the comparing. The method may further include indicating a dispute exists. The method may also include resolving the dispute. The method may further include forwarding royalties.

In still another embodiment, the invention is a method. The method includes crawling a network with an intelligent agent to find content. The method further includes evaluating the content. The method also includes transmitting a digital fingerprint of the content to a database of content. The method further includes storing the digital fingerprint of the content in the database of the content.

Note, preferably, the system operates in real-time or near real-time. For example, a query may be sent by a content outlet to a database, with a response from the database delivered with minimal delay based on results of the query. This may be achieved in part based on local caching of responses at the content outlet system. This may also be achieved through use of known database technology.

The apparatus and methods may be understood by reference to an embodiment of a system. FIG. 1 illustrates an embodiment of a system for controlling access to content. The system may be used to determine who holds rights to content, identify content to be downloaded, and restrict access to content based on preferences of the rights-holder(s). Moreover, this may allow for monetization of this process. System 100 includes a database 140, content outlets 110, 120 and 130, a claim interface 150, rights-holders 160, 170 and 180, and a crawler 190.

Database 140 includes attributes related to content. For example, a piece or item of content may have attributes for title, author, performer, rights-holders, size/length, type of content, digital fingerprint, rights restrictions, and other attributes. Moreover, a piece of content may have an authorized copy of the content, and the authorized copy may incorporate digital rights management or other restrictive parameters used to implement rights restrictions specified by rights-holders.

Traditional retailers 110 are content outlets which operate using licensed content and provide compensation to rights-holders. Unauthorized peer-to-peer networks 120 are content outlets which provide content regardless of licensing status and without attempting to compensate rights-holders. Authorized peer-to-peer networks 130 are downloading networks using peer-to-peer technology which use licensed content and provide compensation to rights-holders. Note that not all of content outlets 110, 120 and 130 all exist (are in business or organized as a network for example) at one time. When a content outlet (110, 120 or 130) is ready to provide a song or other content for download, it may query database 140 and determine restrictions on the content. If the content in question is identifiable in comparison to content for which attributes are stored in the database 140, then other attributes of the content will provide information about restrictions on the content (such as limited copying, play-only versions, limited-use versions for example). These restrictions may then be embedded with the content which is provided for download by the content outlet. Alternatively, an authorized copy of content may be provided, thereby embedding desired restrictions and preserving quality at a certain level.

Determining the restrictions on content requires determining who owns or has rights to the content (the rights-holders). Claim interface 150 allows for access to the database 140 by rights-holders. Rights-holders 160, 170 and 180 may all use claim interface 150 to assert ownership or other rights in content. Preferably, rights-holders provide content which they have rights in, and that content may then be evaluated to determine attributes such as title, type of content, and digital fingerprint. Alternatively, content may be discovered on the Internet or other networks, and rights-holders may then use the claim interface to assert rights in the work embodied in the content so discovered. For example, the crawler 190 may be implemented to traverse links on the World Wide Web and thereby discover content, which may then be evaluated by rights-holders to determine whether anyone has a claim to ownership of the content.

Note, in some embodiments, claim interface 150 is an API, or application programming interface for example. The claim interface 150 may operate in a variety of ways. For example, it may be a graphical user interface, allowing for entry of information about content, such as attributes including author, title, performer, for example. This information may be used to query database 140 to determine if such content is known to the database 140, or it may be used to enter these attributes into the database 140. Alternatively, the claim interface 150 may be implemented for some form of bulk or batch data entry, whereby a stream or file of data is provided to the claim interface related to numerous separate or related pieces of content, either for query purposes or for data entry purposes for example. Moreover, the claim interface 150 may allow for entry of actual content into the database 140. Whether actual content or a digital fingerprint of the content (or both) is stored, querying the database 140 based on content may occur by comparing digital fingerprints.

On occasion, rights-holders may assert multiple conflicting claims to content. Not all multiple claims will conflict. For example, authorship and performance of a song may both provide copyright rights for a separate author and performer, without an outright conflict. That the two rights-holders disagree about how to handle content is not the same as a conflict where two entities purport to be the owner of an authorship copyright on a song. When the same rights are asserted by multiple parties, some form of conflict resolution may be necessary. Royalties may be held in trust, or the song (or other content) may be restricted from any copying. Alternatively, ownership conflicts may be initially decided based on a reputation rating maintained by the claim interface, with high reputation rankings assigned to reputable companies or companies having previously proven content ownership, and low rankings assigned to those having asserted false claims or with little prior experience. Preferably, an appeal process may be implemented to allow for human intervention after a determination based on reputation rankings occurs. For example, a reputable label may assert claims to its catalog as it stood on a particular date. Another small label may assert claims to a set of songs within this catalog. The reputations may be such that the reputable label wins. However, the small label may be able to show an assignment of rights to a human and thus prove its claims. Alternatively, the small label may be acting improperly, and thus correctly have its claims rejected.

Figure 2A:
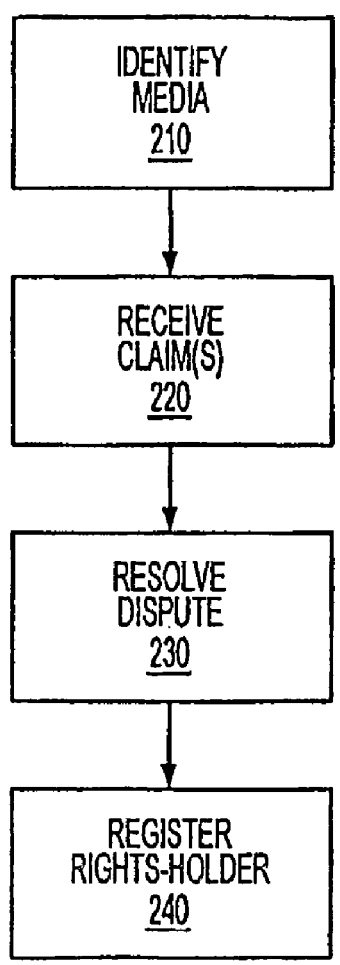
FIG. 2A illustrates an embodiment of a method of determining rights-holders of content.

Various methods may be used to determine who is legitimately a rights-holder to content. FIG. 2A illustrates an embodiment of a method of determining rights-holders of content. The method may be implemented in conjunction with a system such as that described with respect to FIG. 1, or with alternative systems for example. The method includes identifying media, receiving claims to the media, resolving disputed claims, and registering the rights-holder. At module 210, the media or content is identified. This may occur as a result of content submitted for identification by a content outlet, content submitted as part of a claim by a rights-holder, or content discovered by a software process or agent which crawls a network.

At module 220, claims to the content are asserted. Note that these modules may interact in a fashion other than linearly, such that claims may be asserted well after content is identified, and even after a rights-holder has been identified. With a claim asserted, information about the content will also be supplied, such as author, performer, title, digital fingerprint of content, even an authorized copy of content.

If multiple claims are asserted, at module 230 disputes between claims are resolved. As mentioned with respect to FIG. 1, this may involve reputation based resolution, or may involve only human intervention. At module 240, rights-holder(s) to the content are registered, along with their requirements of restrictions on copying the content. At this point, access to the content may be controlled based on rights asserted by the rights-holders, and royalties on the content may be distributed to the rights-holders as copying occurs. Moreover, changes in rights to content may be tracked, allowing for assignments or expirations of copyrights (should that ever be allowed). Note that not all of these modules may be required for a working method, as a useful method may be implemented using some subset of the modules described. Also, note that monetization of this method may occur, such as through a fee for asserting claims or resolving disputes, or through some form of subscription or periodic fee for example.

Figure 2B:
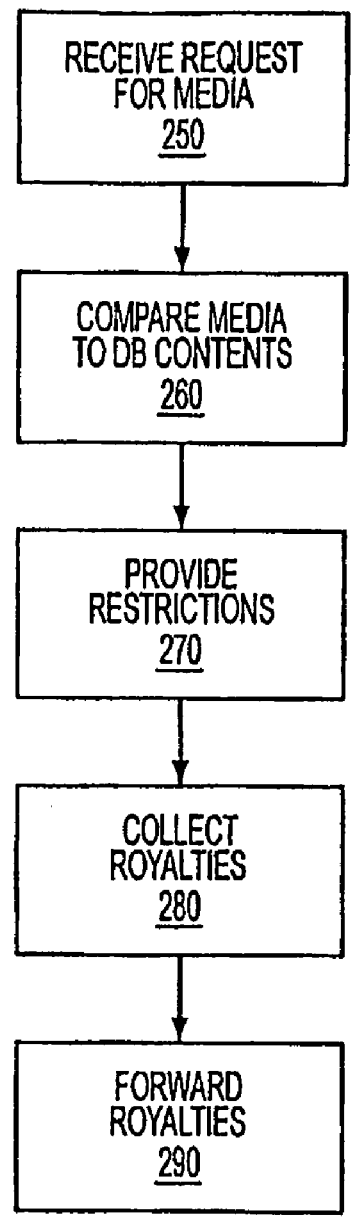
FIG. 2B illustrates an embodiment of a method of providing content.

Whether the rights-holders to content are clear or not, some content may be provided by various methods. FIG. 2B illustrates an embodiment of a method of providing content. The method may be implemented in conjunction with a system such as that described with respect to FIG. 1, or with alternative systems for example. The method includes receiving a request for media or content, comparing media to contents of a database, providing restrictions to the media, collecting royalties, and forwarding royalties. Note that not all of these modules may be required for a working method, as a useful method may be implemented using some subset of the modules described.

At module 250, a request for media or content is received. This request may come from a content outlet for example, which is attempting to satisfy requirements imposed by copyright law. At module 260, the media or content is compared to records in a database to determine what the content is. Preferably, a digital fingerprint or similar technology is used to identify the content, such that digital fingerprints may be compared. Alternatively, attributes such as title, author, and/or performer for example may be compared. Moreover, content may be compared bodily, such that two digital files representing songs may be compared on a bitwise level for example. When a hit or a match is found, the database may have information about copyright restrictions and rights-holders who are due royalties.

At module 270, any available restrictions are provided. This may be as simple as providing a message or set of parameters, with the parameters embedded or otherwise including as digital rights management restrictions. Alternatively, this may involve providing an authorized copy with embedded restrictions. As another alternative, a rights-holder may prohibit copying, such that the content outlet must not perform the download.

At module 280, royalties are collected. This may occur in the form of a payment from the content outlet to the operator of the database, with records of the database used to account for such payments. Note that rather than processing a micropayment for each song or other piece of content, periodic payments of many individual royalties may be made (such as monthly payments for example). Moreover, at module 290, royalties are forwarded to rights-holders. This may again involve a periodic payment based on multiple individual micropayments. Additionally, royalties may be forwarded after deduction of a fee for handling the royalties, either as a percentage or as some form of fixed fee. Likewise, payments may be required for each request for media, each successful request (a match is found), or each request resulting in a download for example. Other options for monetization may also be employed, such as a subscription model for example.

Figure 3:
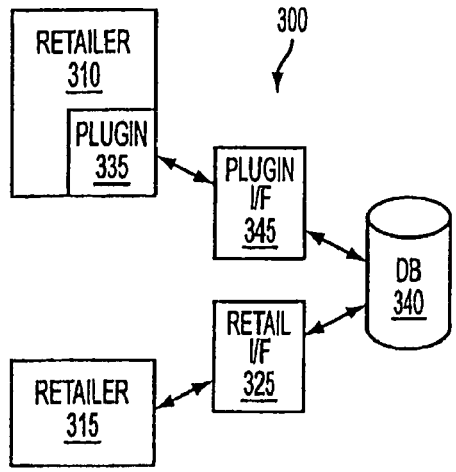
FIG. 3 illustrates an embodiment of a system for providing content.

In various embodiments of methods of providing content, various systems may be used. FIG. 3 illustrates an embodiment of a system for providing content. The system may allow for interaction between content outlets (retailers) and a database of content to determine restrictions on content and collect royalties. System 300 includes a database 340, plug-in interface 345, retail interface 325, plugin 335, and may be used in conjunction with retailers 310 and 315. The system illustrated may be part of a larger system—the portion illustrated is useful for working with content outlets.

Database 340 is a database of content, attributes related to content, or both. It may be accessed through plugin interface 345 or through retail interface 325. Retailer 315 is a content outlet which accesses database 340 through retail interface 325. Retailer 315 may allow for download of music through its system for example, and may query database 340 to determine the status of songs to be downloaded. The query may be sent with attributes of the songs/content or with the actual songs/content. The return information from database 340 may include an indication the content has not been claimed, restrictions on the content, an authorized copy of the content, or an indication of prohibition of copying content. As illustrated, retailer 315 must handle these signals and properly format its queries for use with interface 325, but otherwise directly queries database 340.

Alternatively, retailer 310 may be a content outlet which integrates into its software plugin 335. Plugin 335 may be a local interface module which works with software used by retailer 310 in either a previously specified or a customized manner. Retailer 310 may query plugin 335 about availability of content (such as a song) for download. Plugin 335 may then pass the query to plugin interface 345, which may then properly query database 340 about the content in question. The response from database 340 may then be interpreted or reformatted by plugin interface 345 and plugin 335 such that retailer 310 may use the response in its processing. Generally, the response would be the same as that provided to retailer 315 in the above description. Note that plugin 335 may perform relatively simple activities such as reformatting data, or more complex activities, such as determining a digital fingerprint for content provided by retail outlet 310.

Figure 4:
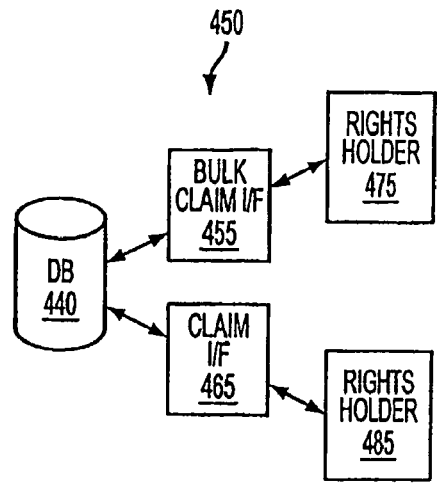
FIG. 4 illustrates an embodiment of a system for determining rights-holders of content.

Just as various methods of providing content may use various systems, various methods of determining rights-holders may use various systems. FIG. 4 illustrates an embodiment of a system for determining rights-holders of content. The system illustrated may be part of a larger system—the portion illustrated is useful for working with rights-holders. The system may allow for interaction between rights-holders and a content database to register rights-holders and resolve disputes. The system 450 includes a database 440, bulk claim interface 455, claim interface 465, and is designed to work with rights-holders 475 and 485 (among others).

Database 440 is a content database, such as database 140 of FIG. 1. Database 440 may include content, attributes of content, or both. Bulk claim interface 455 is an interface that allows for submission of multiple or numerous claims (such as submission of claims for performance copyright to a set of songs and the associated collections of those songs for example). Bulk claim interface 455 may be restricted to access by rights-holders known to submit multiple claims, or may be provided for any rights-holder willing to use a stream of information rather than a user interface. As an example, rights-holder 475 may assert claims to all songs in a catalog it has just purchased from another rights-holder by providing a file with information about all of the content in the catalog in question.

Alternatively, for assertions of rights to only a few songs or pieces of content, claim interface 465 may be used. Claim interface 465 may be a graphical user interface or other human-interactive interface which an employee of a rights-holder to an individual rights-holder may use. For example, rights-holder 485 may assert authorship copyright to his or her set of published songs (which may be a small number for many authors) using claim interface 465. One may expect that claim interface 465 would allow for entry of all available attributes, along with submission of a digital fingerprint or authorized copy of content.

For each interface (455, 465), results may come in the form of registration of the rights-holder, indication of a conflict (with or without resolution), indication of a match between the content registered and previously entered content (such as found by a crawler or requested by a content outlet), or some other result. In the case of the bulk claim interface 455, these results may be provided as a file or stream of results sent to the rights-holder 475, or as information available for access by the rights-holder 475 at convenience of the user. In the case of claim interface 465, these results may be provided graphically or in another manner intelligible to a user, or may be available for lookup after periodic processing/updates of the database occur. Note that operations of this system may be monetized, such that rights-holders may pay to register claims, to receive royalties, or for some other form of service. Payment of royalties, such as due to registration of a rights-holder for an item of content, are not illustrated in the figure, but may be understood as to occur either electronically or by means of mailing of checks to rights-holders for example.

Figure 5:
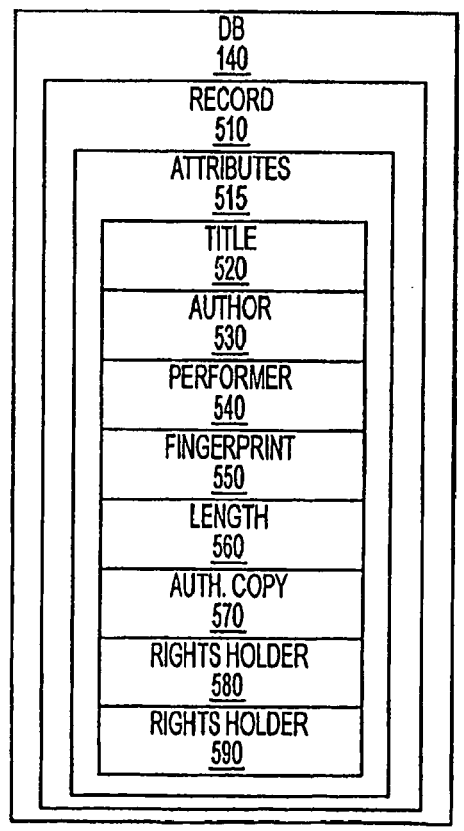
FIG. 5 illustrates an embodiment of a record of content in a database.

To track information related to content and rights-holders, various data structures may be used. FIG. 5 illustrates an embodiment of a record of content in a database. The record 510, in one embodiment, is organized into a set of attributes 515, which may be stored as name-value pairs (or code-value pairs). Note that none of the attributes 515 are necessarily mandatory. Attributes illustrated include title 520 (title of a song for example), author 530 (author/composer of a song for example), performer 540 (performer of a song for example), fingerprint 550 (digital fingerprint of a song in digital format for example), length 560 (playing time of a song for example), authorized copy 570 (copy to be provided when content is requested for example), rights-holder 580 (first rights-holder associated with content for example), and rights-holder 590 (second rights-holder associated with content for example).

Note that each of these attributes may also apply to a movie, comedic performance, document (maybe not the performer 540 in that case) or other form of content. Also, note that other attributes may be stored, such as restrictions for DRM purposes or prohibitions on copies for example. Similarly, other formats or relationships for the data in question may be utilized, such as formats dictated by metadata in a database for example. Thus, the data structure or record of FIG. 5 is illustrative rather than restrictive in nature.

Figure 6:
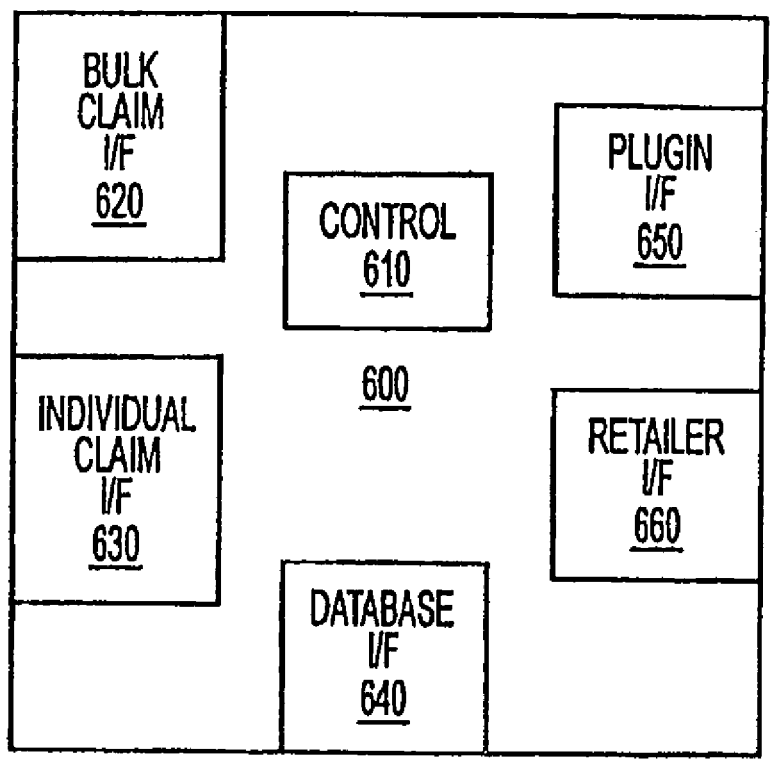
FIG. 6 illustrates an embodiment of a medium (or media) which may in turn embody instructions which, when executed by a processor, may cause the processor to perform a method.

Data structures of various types may be used with programs, which are typically embodied in media or a medium. FIG. 6 illustrates an embodiment of a medium (or media) which may in turn embody instructions which, when executed by a processor, may cause the processor to perform a method. A medium may be a single piece of media or a collection of media, without materially changing the medium. In the embodiment illustrated, the medium includes a control module, claim interfaces (for rights-holders), outlet interfaces, and a database interface. More specifically, medium 600 includes a control module 610, bulk claim interface 620, individual claim interface 630, database interface 640, plugin interface 650, and retailer interface 660.

Bulk claim interface 620 and individual claim interface 630 are modules which implement the claim interface for rights-holders. Rights-holders with large numbers of claims to content or a steady stream of claims to content may use bulk claim interface 620 to provide claim information. Rights-holders with few claims or infrequent claims may use individual claim interface 630. Similarly, plugin interface 650 and retailer interface 660 are modules which implement the interface with content outlets. Content outlets may include a plugin, and thereby use plugin interface 650, or not include a plugin, and communicate directly with retailer interface 660.

Database interface 640 interfaces with a database of content and rights-holder information. Control module 610 controls each of the other modules. Thus, control module 610 may process a request from a retailer through plugin interface 650 or retailer interface 660 by causing database interface 640 to search for content within an associated database. Upon finding a match, information from database interface 640 may be directed back to either plugin interface 650 or retailer interface 660 and thereby to the content outlet originally submitting the request.

Similarly, control module 610 may receive a claim either through bulk claim interface 620 or individual claim interface 630, and direct that information through database interface 640 to the associated database. Control module 610 may manage resolution of conflicting claims based on feedback from database interface 640. Moreover, control module may send information about royalty rates and download frequency through claim interfaces 620 and 630 to rights-holders, along with electronic payments of royalties. Note that control 610 may also direct a crawler interface (not shown) which may be used to receive information about content and populate a database through database interface 640. Such a medium may be used in conjunction with various computer or machine embodiments.

Figure 7:
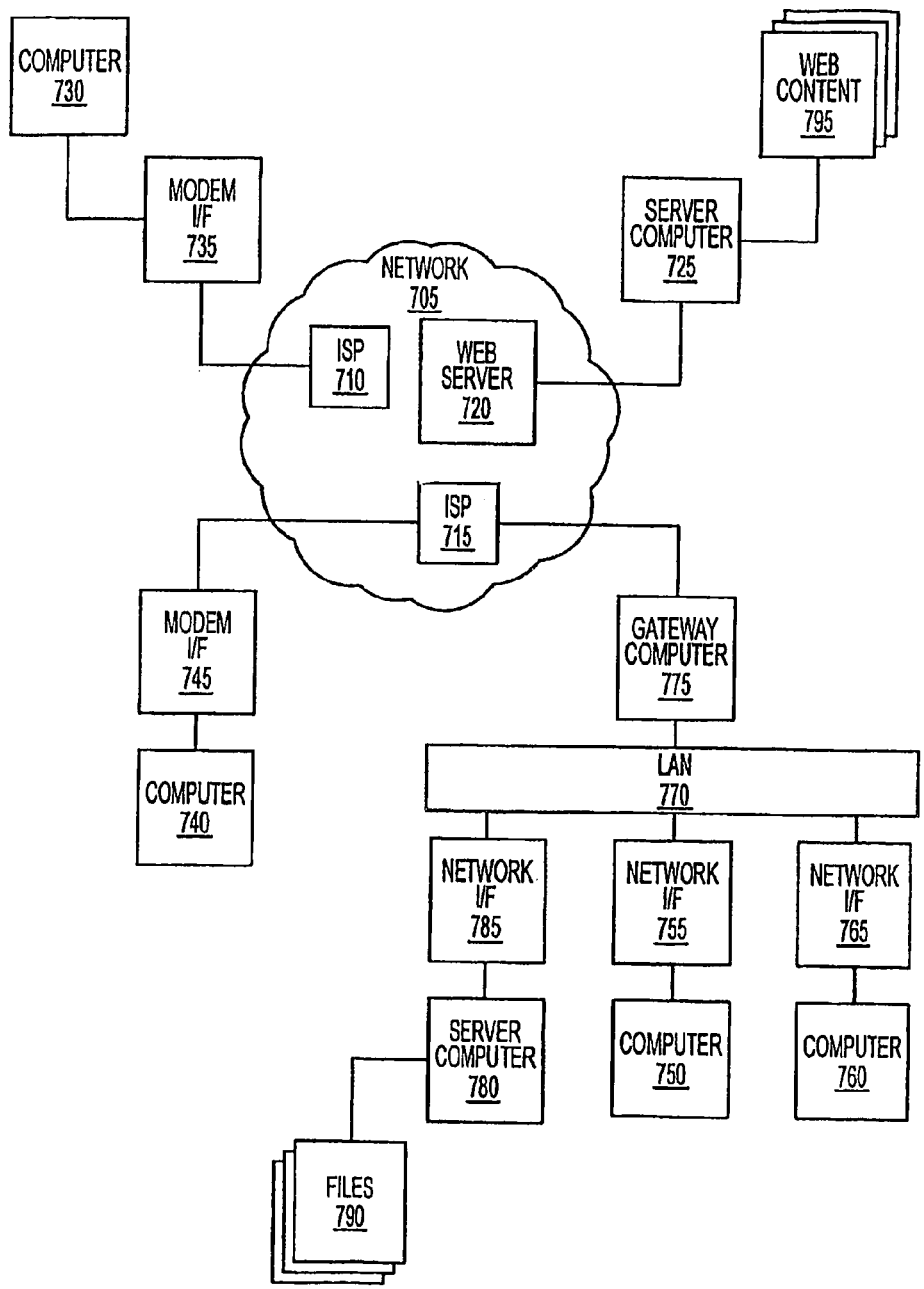
FIG. 7 shows embodiments of several computer systems that are coupled together through a network.
Figure 8:
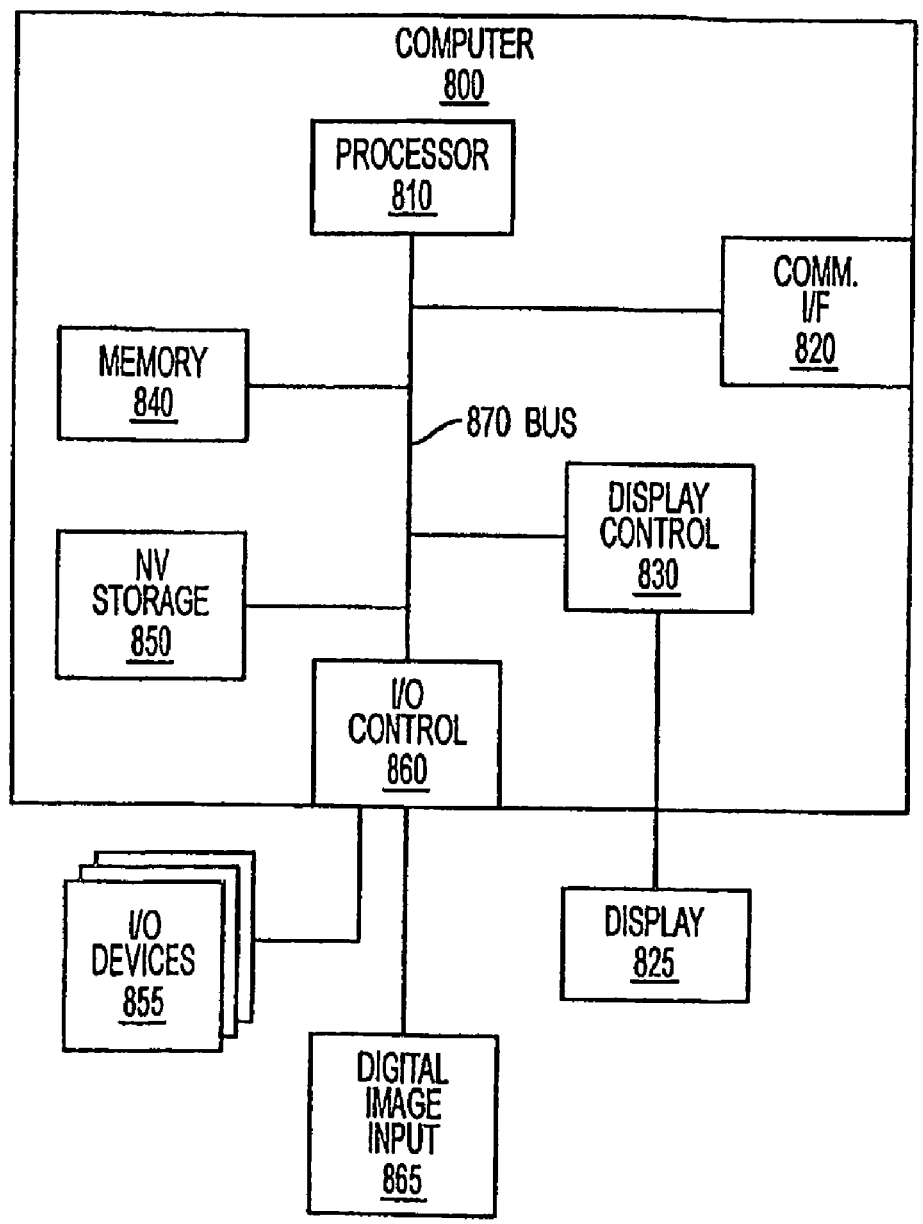
FIG. 8 shows one embodiment of a conventional computer system that can be used as a client computer system or a server computer system or as a web server system.

The following description of FIGS. 7-8 is intended to provide an overview of computer hardware and other operating components suitable for performing the methods of the invention described above, but is not intended to limit the applicable environments.

Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, mini-computers, mainframe computers, and the like. The invention can also be practiced in distributed computing environments where tasks are performed by remote processing devices that are linked through a communications network.

FIG. 7 shows several computer systems that are coupled together through a network 705, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 which is considered to be "on" the Internet. Often these web servers are provided by the ISPs, such as ISP 710, although a computer system can be set up and connected to the Internet without that system also being an ISP.

The web server 720 is typically at least one computer system which operates as a server computer system and is configured to operate with the protocols of the World Wide Web and is coupled to the Internet. Optionally, the web server 720 can be part of an ISP which provides access to the Internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 which can be considered part of the client computer system 730. The client computer system can be a personal computer system, a network computer, a Web TV system, or other such computer system.

Similarly, the ISP 715 provides Internet connectivity for client systems 740, 750, and 760, although as shown in FIG. 7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, ISDN modem, cable modem, satellite transmission interface (e.g. "Direct PC"), or other interfaces for coupling a computer system to other computer systems.

Client computer systems 750 and 760 are coupled to a LAN 770 through network interfaces 755 and 765, which can be Ethernet network or other network interfaces. The LAN 770 is also coupled to a gateway computer system 775 which can provide firewall and other Internet related services for the local area network. This gateway computer system 775 is coupled to the ISP 715 to provide Internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 8 shows one example of a conventional computer system that can be used as a client computer system or a server computer system or as a web server system. Such a computer system can be used to perform many of the functions of an Internet service provider, such as ISP 710. The computer system 800 interfaces to external systems through the modem or network interface 820. It will be appreciated that the modem or network interface 820 can be considered to be part of the computer system 800. This interface 820 can be an analog modem, ISDN modem, cable modem, token ring interface, satellite transmission interface (e.g. "Direct PC"), or other interfaces for coupling a computer system to other computer systems.

The computer system 800 includes a processor 810, which can be a conventional microprocessor such as an Intel Pentium microprocessor or Motorola Power PC microprocessor. Memory 840 is coupled to the processor 810 by a bus 870. Memory 840 can be dynamic random access memory (DRAM) and can also include static RAM (SRAM). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below.

In addition, the present invention is not described with reference to any particular programming language, and various embodiments may thus be implemented using a variety of programming languages.

Alternate Embodiment

Figure 9:
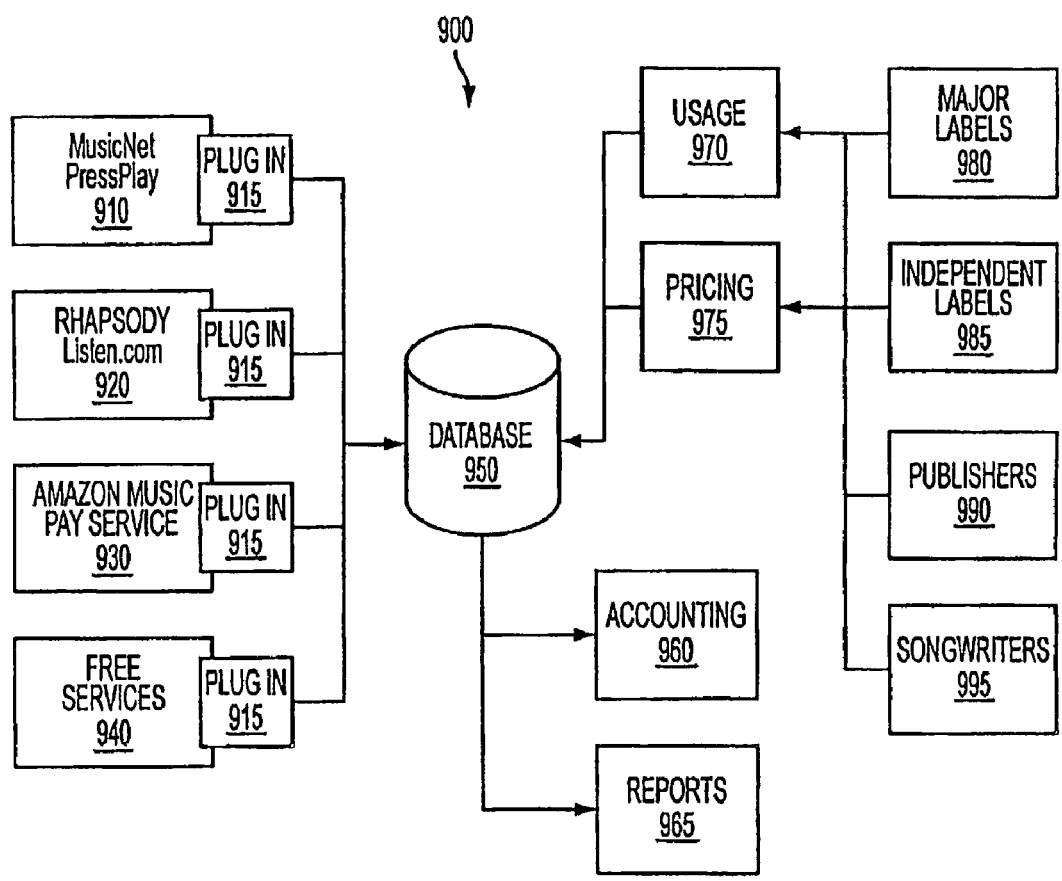
FIG. 9 illustrates an alternate embodiment of a system for controlling access to content.

The illustrated database system of FIG. 9 is an embodiment of a complete open online licensing and royalty distribution system for digital media. Traditionally, licenses for media required individually negotiating deals with copyright holders with terms that are not generally publicly disclosed, making it an extremely time intensive task.

Such a database system, in some embodiments, provides a centralized clearinghouse for all digital media. The system may enable content owners to protect the content owner's intellectual property rights associated with the content. The system can also provide authentication services, as well as tracking and reporting services associated with the management of the distribution of content.

The system may, in various embodiments, provide a centralized system for the following functions:

1) allow copyright holders to offer licenses of their copyrighted intellectual property;
2) allow copyright holders to request filtering for their content;
3) allow online media distributors to get access, in real-time, to the licenses offered by the copyright holders based on the capabilities of the particular service;
4) handle real-time licensing rights accounting;
5) handle royalty collection;
6) handle royalty distribution; and
7) allow online media distributors to determine, in real-time, the licensing status (or lack thereof) of items of content.

The system may eliminate the barrier that prevents content from getting into the media distribution market. At the same time, the system may allow the content industries to leverage the system to filter out, in real-time, the content of illicit distribution services.

FIG. 9 is a block diagram that illustrates an overview of an embodiment of the system. Copyright-holders (rights-holders), such as labels, studios and artists publish on the system (in the database for example), the terms associated with digitally distributing the content owned by the copyright-holders. Distributors of digital media can then secure and pay for the content on the system. This potentially allows the consumer to get full-breadth of high quality content (digital media) in a seamless and legal manner. In certain embodiments, the system employs a plug-in architecture that enables essentially instant access to a legitimate library of digital media.

According to certain embodiments, an apparatus is configured to accept, in real-time, licensing information about digital media from copyright holders or from owners of licensing rights, and allow third-party media distribution services to select, in real-time, the licenses for digital media that the media distribution services are interested in distributing. The apparatus, in some embodiments, may also be configured to process, in real-time, license requests for digital media from online media distribution services and to account for, in real-time, each license that is accessible.

In further detail, the system 900 illustrated in FIG. 9 is an alternate embodiment of a system for controlling access to content. Database 950 stores data related to rights-holders (e.g. 980, 985, 990, 995 for example), distributors (such as content retailers or outlets 910, 920, 930, or 940 for example), and related to content (such as attributes or actual content for example). As illustrated, distributors 910, 920, 930 and 940 each use a plug-in 915 to interface with database 950, thereby allowing for requests for permission to distribute content and responses including denial, unconditional permission, restricted permission, known good copies, or lack of data related to the content. Moreover, the plug-in 915 may function to monetize content transactions, allowing for use of the database 950 as a clearinghouse for royalties for example.

Rights-holders (980, 985, 990, and 995) each claim rights through usage module 970 and set pricing or other restrictions through pricing module 975 for example. Data from modules 970 and 975 may be some or all of the data stored or encoded in database 950. Accounting module 960 provides an interface to database 950 allowing for financial examination and control of database 950. Similarly, reports module 965 provides an interface to database 950 allowing for production of visually perceptible presentations of data from database 950, such as activity or commercial charts for example.

According to certain embodiments, a mechanism is provided for:

1) determining licenses for digital media using multiple fingerprint technologies based on the type of media requested;

2) determining, in real-time, the licenses that are available to digital media distribution services based on the capability of the digital media distribution services to handle licensing restrictions;

3) enabling the filtering (banning) of certain media files on third-party distributed systems;

4) trusted accounting for media file license requests with third-party media distribution services;

5) determining, in real-time, the affects on income due to potential changes in licenses of online media;

6) modifying the available licenses for media files in real-time and causing the modified licenses to propagate to all participating media distribution services immediately;

7) providing time-based and limited licensing restrictions for digital media based on time of day, promotional periods, number of users who have the digital media file, etc. that are only made available to online media distribution services when the restrictions for the licenses are met by a system;

8) determining, in real-time, the licenses that are available to digital media distribution services based on the consumer's country of origin.

Sources of revenue for the system may include one or more of the following:

1) Charge transaction fee for content deployed by distribution services;

2) Charge content owners for running the database and preventing piracy;

3) License technology to music services (both free and pay music services)

4) Provide an authoring tool for content creators to easily copyright and fingerprint their work online;

5) Provide services for creation of the copyright database (content owners);

6) Enabling new music services such as:

A) Collection of ongoing fees for administration of rights accounting;

B) Offering data-mining, reporting, & custom analytics;

C) Audit rights compliance across music services;

D) Enabling a consumer "personal rights locker";

E) OEM music infrastructure, "Google of music", search & recommendations, for example.

From the foregoing, it will be appreciated that specific embodiments of the invention have been described herein for purposes of illustration, but that various modifications may be made without deviating from the spirit and scope of the invention. For example, the disclosed methods and apparatuses have been described primarily in terms of use with songs, while content of many different forms may be managed in the same manner. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

The invention claimed is:

1. A computer implemented method comprising:
receiving a first song claim from a first claimant at a claim interface;
receiving a second song claim from a second claimant at the claim interface;
comparing the first song claim and the second song claim to records of a database of songs in communication with the claim interface;
if there is a dispute between the first song claim and the second song claim, attempting to resolve the dispute by checking reputation ratings of the first and second claimants within a reputation database in communication with claim interface, the reputation ratings indicating previously proven or unproven content ownership, wherein, the reputation ratings are ranked between high and low rankings,
high rankings indicate reputable claimants with previously proven content ownership, and
low rankings indicate claimants previously asserting false claims;
implementing an appeal process in response to the attempting to resolve the dispute after a determination based on reputation ratings, the appeal process allowing for human intervention in the dispute; and
indicating results of the comparing, the attempting to resolve, and the implemented appeal process.

2. The method of claim 1, further comprising: registering results of the comparing in the database of songs.

3. The method of claim 1, wherein the song is selected from the group consisting of a composition and a musical work.

4. The method of claim 1, wherein the song is in the form of a recording, and the receiving the first and second song claims includes receiving a digital fingerprint of the song.

5. The method of claim 1, wherein the first and second song claims are received from one or more rights holders selected from the group consisting of a label, a studio, an artist, a composer, a publisher, and a rights administrator.

6. The method of claim 1, further comprising: holding proceeds of a song associated with the first and second song claims in trust pending the results of the resolving.

7. The method of claim 1, further comprising: receiving a known good copy of a song associated with the first and second song claims.

* * * * *